United States Patent Office 3,288,856
Patented Nov. 29, 1966

3,288,856
GLYCEROL ETHERS
Silvano Casadio, Milan, Italy, assignor to Istituto de Angeli, Milan, Italy, a corporation of Italy
No Drawing. Filed Oct. 3, 1963, Ser. No. 313,452
Claims priority, application Great Britain, Oct. 10, 1962, 38,407/62
4 Claims. (Cl. 260—592)

The present invention is concerned with glycerol ethers of acyl phenols having valuable pharmacological properties.

According to the invention, we provide compounds of the general formula

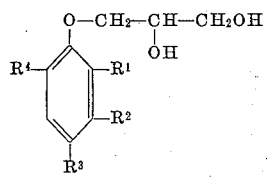

(I)

in which $R^1$, $R^2$, $R^3$ and $R^4$, which may be the same or different, represent hydogen or halogen atoms or hydroxy, alkyl, alkoxy or acyl groups, at least one of the substituents $R^1$, $R^2$, $R^3$ and $R^4$ being an acyl group.

The compounds according to the invention possess a sedative action on the central nervous system and are thus useful as tranquilizers. Furthermore, the compounds exert a relaxing influence on muslces. In our experiments the compounds according to the invention have shown low toxicities, the $LD_{50}$ in mice of the compounds administered intraperitoneally being in the range of from 250 to 77 mg./kg. When administered by the intravenous route, the $LD_{50}$ is in the range of from 150 to 500 mg./kg. and when administered per os from 400 to 1100 mg./kg.

Where the groups $R^1$, $R^2$, $R^3$ and $R^4$ are carbon containing groups it is preferred that each of such groups should contain not more than 4 carbon atoms, and especially preferred compounds are those in which at least one of the groups $R^1$, $R^2$, $R^3$ and $R^4$ is an acetyl or propionyl group, the remainder of $R^1$, $R^2$, $R^3$ and $R^4$ being hydrogen or halogen atoms or methyl or methoxy groups, at least one of said substituents $R_1$, $R_2$, $R_3$ and $R_4$ being a member of the latter group. A compound of particular interest for its useful sedative activity is 3-(2-methoxy-4-propionyl-phenoxy)-1,2-propanediol.

The compounds according to the invention may conveniently be prepared, for example, by ether-forming reactions.

According to a further feature of the invention, therefore, compounds of general Formula I are prepared by an ether-forming reaction between the corresponding phenol (or a salt thereof) and glycerol or a reactive derivative thereof. Such reaction may be schematically represented as follows

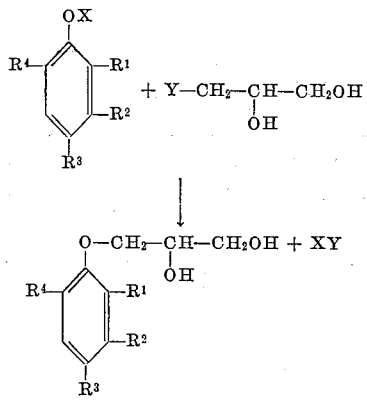

where X and Y are atoms or groups which combine together and split off during the reaction with formation of the desired ether.

Thus for example the phenol, preferably as an alkali metal salt thereof, may be reacted with a glycerol halohydrin e.g. glycerol chlorohydrin. In a preferred manner of conducting this reaction, the phenol and glycerol chlorohydrin are reacted together in solution in an alkanol, e.g. ethanol, in the presence of an alkali metal alkoxide (sodium ethoxide being particularly preferred), or an alkali metal hydroxide (for example potassium hydroxide). The time of reaction appears to depend largely upon the steric hindrance of the phenol molecule. With compounds which are less sterically hindered a reaction time of 2 hours is generally sufficient; longer times, up to about 25 hours, may be required for the more sterically-hindered phenols. The reaction is conveniently effected at elevated temperature, for example at the boiling point of the reaction mixture.

The glycerol ethers according to the invention are generally obtained as colourless, crystalline solids melting below 100° C. Some compounds are very viscous, higher-boiling liquids. The compounds are in general water soluble, although the degree of solubility varies.

According to a further feature of the invention, we provide pharmaceutical compositions comprising as active ingredient one or more compounds of general Formula I as hereinbefore defined in association with one or more pharmaceutical carriers excipients. The compositions may also contain other active substances, e.g., other substances with a sedative or tranquilizing action, or with a relaxing influence on muscles. The compositions may be in liquid form suitable for oral administration, for example, syrups, drops or elixirs, comprising, for example, an oily carrier, as in oil-based emulsions, or more preferably an aqueous carrier, together with sweetening, flavouring, suspending, thickening and/or other agents; or in liquid form suitable for parenteral administration, e.g. injectable solutions, with a sterile physiologically acceptable liquid carrier. The compositions may also be in solid form, for example, powders and granules, but preferably take the form of dosage units, for example, tablets, coated tablets, dragees cachets, pills, capsules or suppositories. Suitable carrier or excipients include lactose, starches (especially corn, maize potato and soluble starches), silica, magnesium stearate, talc; and suppository bases such as cocoa butter and polyglycolic hydrosoluble excipient.

The dosage units generally contain from 0.005 g. to 0.50 g. of active ingredient, advantageously at least 0.025 g. For general purposes, dosage units containing not more than 0.250 g. are preferred.

For better understanding of the invention the following examples are given by way of illustration only:

*Example 1.—3-(4-propionyl-phenoxy)-1,2-propanediol*

36 g. (0.24 mole) of p-hydroxy-propiophenone are dissolved in an alcoholic solution of sodium ethoxide prepared from 5.8 g. (0.25 mole) of sodium and 150 ml. of anhydrous ethanol. The solution is heated to boiling and 29 g. (0.26 mole) of glycerol α-monochlorohydrin are added over a period of 2 hours. The mixture is then refluxed for 2 further hours. After cooling to room temperature, the sodium chloride formed is removed by filtration and the mixture is distilled to dryness under reduced pressure. A residue is obtained, which is extracted with chloroform; the chloroform solution is washed several times with small amounts of water to neutrality, dried over sodium sulphate and distilled to dryness under reduced pressure. A brown residue is obtained, which solidifies upon standing overnight. By triturating it with ether in a mortar, crude 3-(4-propionyl-phenoxy)-1,2-propanediol is obtained. It is purified by recrystallization from methanol/ether.

*Example 2.—3-(2,6-dimethyl-4-propionyl-phenoxy)-1,2-propanediol*

11.1 g. (0.062 mole) of 2,6-dimethyl-4-propionyl-phenol are dissolved in an alcoholic solution of sodium ethoxide prepared from 1.43 g. (0.062 mole) of sodium and 120 ml. of anhydrous ethanol. The solution is heated to boiling and 7.5 g. (0.168 mole) of glycerol α-monochlorohydrin are added over a period of 2 hours and the mixture is then refluxed for a further eight hours. After cooling to room temperature, the sodium chloride formed is filtered off and the mixture is distilled to dryness under reduced pressure. A residue is obtained which is extracted with chloroform; the chloroform solution is washed twice with a 10% solution of sodium hydroxide, then with water to neutrality, dried over sodium sulphate and distilled to dryness under reduced pressure. A tacky residue is obtained, which upon trituration with petroleum ether in a mortar yields crude 3 - (2,6 - dimethyl - 4 - propionyl - phenoxy) - 1,2-propanediol, which is purified by recrystallization from benzene.

*Example 3.—3-(2-methyl-4-acetyl-phenoxy)-1,2-propanediol*

23 g. (0.153 mole) of 2-methyl-4-acetyl-phenol are dissolved in an alcoholic solution of sodium ethoxide prepared from 3.52 g. (0.153 mole) of sodium and 150 ml. of anhydrous ethanol. The solution is heated to boiling and 18.6 g. (0.168 mole) of glycerol α-monochlorohydrin are added over a period of 2 hours, and the mixture is then refluxed for a further six hours. After cooling to room temperature, the sodium chloride formed is filtered off and the solution is distilled to dryness under reduced pressure. A residue is obtained which is triturated with anhydrous ether to yield crude 3-(2-methyl-4-acetyl-phenoxy)-1,2-propanediol, which is recrystallized from benzene.

*Example 4.—3-(3-propionyl-4-hydroxy-phenoxy)-1,2-propanediol*

29.5 g. (0.178 mole) of 3-propionyl-4-hydroxy-phenol are dissolved in an alcoholic solution of sodium ethoxide prepared from 4.09 g. (0.178 mole) of sodium and 300 ml. of anhydrous ethanol. The solution is heated to boiling and 21.6 g. (0.195 mole) of glycerol α-monochlorohydrin are added over a period of 2 hours, and refluxing is continued for a further fourteen hours. After cooling to room temperature, the sodium chloride formed is filtered off and the solution is distilled to dryness under reduced pressure to yield crude 3-(3-propionyl-4-hydroxy-phenoxy)-1,2-propanediol, which is purified by further distillation, the fraction boiling at 167–173° C./0.06 mm. Hg being collected.

*Example 5.—3-(2-chloro-4-propionyl-phenoxy)-1,2-propanediol*

23.4 g. (0.127 mole) of 2-chloro-4-propionyl-phenol are dissolved in an alcoholic solution of sodium ethoxide prepared from 2.92 g. (0.127 mole) of sodium and 200 ml. of anhydrous ethanol. The solution is heated to boiling and 16.9 g. (0.153 mole) of glycerol α-monochlorohydrin are added over a period of 2 hours, and refluxing is then continued for a further two hours. After cooling to room temperature, the sodium chloride formed is filtered off and the solution is distilled to dryness under reduced pressure. A residue is obtained, which is extracted with ethyl acetate; the organic solution is washed twice with a 10% solution of sodium hydroxide, then with water to neutrality, dried over sodium sulphate and distilled to dryness under reduced pressure. The residue of crude 3-(2-chloro-4-propionyl-phenoxy)-1,2-propanediol is purified by distillation, the fraction boiling at 185–200° C./0.2 mm. Hg being collected. By washing the liquid product with anhydrous ether, a solid is obtained, melting point 70° C.

*Example 6.—3-(2-chloro-6-propionyl-phenoxy)-1,2-propanediol*

10.6 g. (0.057 mole) of 2-chloro-6-propionyl-phenol are dissolved in an alcoholic solution of sodium ethoxide prepared from 1.3 g. (0.057 mole) of sodium and 150 ml. of anhydrous ethanol. The solution is heated to boiling and 6.9 g. (0.0627 mole) of glycerol α-monochlorohydrin are added over a period of 2 hours, and refluxing is then continued for a further 25 hours. After cooling to room temperature, the sodium chloride formed is filtered off and the solution is distilled to dryness under reduced pressure. From the residue which is thus obtained, any unreacted 2-chloro-6-propionyl-phenol is removed by steam distillation. The distillation residue is extracted with chloroform, the chloroform solution is dried over sodium sulphate and distilled to dryness under reduced pressure to yield crude 3-(2-chloro-6-propionyl-phenoxy)-1,2-propanediol, which is purified by distillation, the fraction boiling at 150–152° C./0.1 mm. Hg being collected.

The properties of some compounds according to the invention are summarized in the following table which also gives their method of preparation with reference to the preceding examples.

TABLE

| $R^1$ | $R^2$ | $R^3$ | $R^4$ | Empirical formula | Reaction time (hours) | Recrystallization solvent | M.p. or b.p. ° C. | Yield,[1] percent | Prepared as described in Example |
|---|---|---|---|---|---|---|---|---|---|
| H | H | $CH_3CH_2CO$ | H | $C_{12}H_{16}O_4$ | 2 | Methanol/ether | 70–72° | 75 | 1 |
| $CH_3CH_2CO$ | H | H | H | $C_{12}H_{16}O_4$ | 2 | | 170–175°/0.3 mm. Hg | 59 | 1 |
| $CH_3O$ | H | $CH_3CH_2CO$ | H | $C_{13}H_{18}O_5$ | 2 | Benzene | 72–73° | 70 | 1 |
| $CH_3CO$ | H | H | H | $C_{11}H_{14}O_4$ | 4 | | 158–160°/0.2 mm. Hg | 49 | 1 |
| $CH_3$ | H | $CH_3CH_2CO$ | $CH_3$ | $C_{14}H_{20}O_4$ | 8 | Benzene | 74–75° | 81 | 2 |
| $CH_3CH_2CO$ | H | $CH_3$ | H | $C_{13}H_{18}O_4$ | 4 | Benzene/hexane | 78–80° | 71 | 2 |
| $CH_3$ | H | $CH_3CO$ | H | $C_{12}H_{16}O_4$ | 6 | Benzene | 96–98° | 65 | 3 |
| $CH_3$ | H | $CH_3CH_2CO$ | H | $C_{13}H_{18}O_4$ | 2 | do | 83–84° | 82 | 3 |
| $CH_3CH_2CO$ | H | Cl | H | $C_{12}H_{15}O_4Cl$ | 14 | do | 77–79° | 68 | 3 |
| H | $CH_3CH_2CO$ | OH | H | $C_{12}H_{16}O_5$ | 14 | | 165–173°/0.06 mm. Hg | 83 | 4 |
| Cl | H | $CH_3CH_2CO$ | H | $C_{12}H_{15}O_4Cl$ | 2 | | 70° | 59 | 5 |
| $CH_3CH_2CO$ | H | H | Cl | $C_{12}H_{15}O_4Cl$ | 25 | | 150–152°/0.1 mm. Hg | 58 | 6 |

[1] Calculated on crude product.

Example 7A and B

| | A, g. | B, g. |
|---|---|---|
| Tablets.—1,000 units: | | |
| 3-(2-methoxy-4-propionyl-phenoxy)-1,2-propanediol | 50 | 100 |
| Lactose | 150 | 100 |
| Corn starch | 21 | 21 |
| Magnesium stearate | 4 | 4 |

*Preparation.*—The active compound, the excipients and one half of the magnesium stearate are intimately mixed; the mixture is compressed into pellets and granulated. The remaining magnesium stearate is added to the granulated mixture and compressed to give tablets each weighing 0.225 g. Each tablet contains 0.05 or 0.10 g., respectively, of active compound.

Example 8A and B

| | A, g. | B, g. |
|---|---|---|
| Capsules.—1000 units: | | |
| 3-(2-methyl-4-propionyl-phenoxy)-1,2-propanediol | 50 | 100 |
| Corn starch | 47.5 | 95 |
| Talc | 2.5 | 5 |

*Preparation.*—The ingredients are intimately mixed and pulverized; hard gelatin capsules are filled with the powder so obtained to give capsules each containing 0.100 or 0.200 g., respectively, of the mixture, i.e., 0.05 or 0.1 g., respectively, of active compound.

Example 9

Dragees.—1000 units:                                                G.
   3-(2-chloro-6-propionyl - phenoxy) - 1,2 - propanediol _____ 100
   Lactose _____ 75
   Corn starch _____ 22
   Magnesium stearate _____ 3
   Sucrose _____ 190
   Gum-arabic, talc, dist. water, colouring agent, q.s.

*Preparation.*—The homogeneous mixture of active compound, lactose, starch, and magnesium stearate is compressed into domed tablets each weighing 0.2 g. These tablets are then coated with sugar-syrup, gum-arabic, and talc to the weight of 0.4 g.

Each dragee contains 0.1 g. of active compound.

Example 10

Drops—1 litre solution:                                             G.
   3-(2 - methoxy - 4 - propionyl-phenoxy)-1,2-propanediol _____ 50
   Methyl p-hydroxybenzoate _____ 1.8
   Flavour and colouring agent, q.s.
   Dist. water, q.s. to 1 litre

*Preparation.*—The active compound is dissolved, at room temperature, in 9/10 of the necessary water in which, previously, the methyl p-hydroxybenzoate was dissolved at 80° C. After addition of the flavour and colouring agent, the solution is diluted with the remaining water to 1 litre. 20 drops contain about 0.05 g. of active compound.

Example 11

Elixir.—1 litre solution:
   3-(2-methoxy-4-propionyl-phenoxy) - 1,2 - propanediol, g. _____ 10
   Methyl p-hydroxybenzoate, g. _____ 1.8
   Glycerol, g. _____ 40
   Ethyl alcohol, ml. _____ 85
   Sucrose, g. _____ 250
   Flavour and colouring agent, q.s.
   Dist. water, q.s. to 1 litre.

*Preparation.*—Flavour and methyl p-hydroxybenzoate are dissolved in the ethyl alcohol. Glycerol, sucrose, the active compound and the colouring agent are dissolved, at room temperature, in water. The two solutions are stirred together, diluted to 1 litre, and filtered. Each teaspoonful contains 0.05 g. of active compound.

Example 12

Suppositories.—1000 units:                                            G.
   3-(2-methoxy-4-propionyl - phenoxy)-1,2-propanediol _____ 100
   Cocoa butter _____ 1900

*Preparation.*—The well-pulverized active compound is incorporated into the cocoa butter melted at 35° C. The mixture is then poured into slightly pre-cooled moulds to yield suppositories each weighing 2 g. and containing 0.1 g. of active compound.

Example 13

Suppositories.—1000 units:                                            G.
   3-(2-methyl - 4 - acetyl-phenoxy)-1,2-propanediol _____ 150
   Polyglycolic hydrosoluble excipient (M.P. 48° C.) _____ 1850

*Preparation.*—The active compound is dissolved in the polyglycolic excipient melted at 50° C. The mixture is poured into slightly pre-cooled moulds to yield suppositories each weighing 2 g. and containing 0.15 g. of active compound.

Example 14A and B

| | A | B |
|---|---|---|
| Injectable solutions.—1 litre solution: | | |
| 3-(2-Methoxy-4-propionyl-phenoxy)-1,2-propanediol | 50 g. | 100 g. |
| Distilled pyrogen-free water q.s. to | 1 Litre | 1 Litre. |

*Preparation.*—The active compound is dissolved in the distilled pyrogen-free water and the solution so obtained is filtered through a sintered glass filter and filled into 1 ml. vials which are then sterilised at 120° for 20 minutes. Each vial contains 0.05 or 0.1 g. respectively, of active compound.

We claim:
1. 3 - (2 - methoxy - 4 - propionyl-phenoxy)-1,2-propanediol.
2. 3 - (2 - methyl - 4 - propionyl-phenoxy)-1,2-propanediol.
3. 3 - (2 - chloro - 6 - propionyl-phenoxy)-1,2-propanediol.
4. 3 - (2 - methyl - 4-acetyl-phenoxy)-1,2-propanediol.

References Cited by the Examiner
UNITED STATES PATENTS

| | | |
|---|---|---|
| 2,116,104 | 5/1938 | Dohrn et al. _____ 260—592 |
| 2,207,612 | 7/1940 | Coleman et al _____ 260—592 |
| 2,495,904 | 1/1950 | Pines et al. _____ 260—592 |
| 2,768,956 | 10/1956 | Scott. |
| 2,854,379 | 9/1958 | Fancher _____ 167—65 |
| 2,872,374 | 2/1959 | Beiler et al. _____ 167—65 |
| 2,929,848 | 3/1960 | Woodruff et al. _____ 260—592 |

LEON ZITVER, *Primary Examiner.*

D. D. HORWITZ, *Examiner.*